United States Patent
Baumann et al.

(10) Patent No.: US 6,872,441 B2
(45) Date of Patent: Mar. 29, 2005

(54) GLASS CERAMIC AND METAL SUBSTRATES WITH A SELF-CLEANING SURFACE, METHOD FOR THE PRODUCTION AND USE THEREOF

(75) Inventors: Martin Baumann, Bad Vilbel (DE); Klaus-Dieter Fritsche, Colditz (DE); Dagmar Korbelarz, Hanau (DE); Stephan Ludwig, Neuberg (DE); Lutz Poth, Rossdorf (DE)

(73) Assignee: Ferro GmbH, Frankfurt am Main (DE)

( * ) Notice: Subject to any disclaimer, the term of this patent is extended or adjusted under 35 U.S.C. 154(b) by 62 days.

(21) Appl. No.: 10/239,066
(22) PCT Filed: Mar. 13, 2001
(86) PCT No.: PCT/EP01/02790
§ 371 (c)(1), (2), (4) Date: Jan. 16, 2003
(87) PCT Pub. No.: WO01/74739
PCT Pub. Date: Oct. 11, 2001

(65) Prior Publication Data
US 2003/0152780 A1 Aug. 14, 2003

(30) Foreign Application Priority Data
Apr. 1, 2000 (DE) .......................... 100 16 485

(51) Int. Cl.$^7$ ................................ B32B 3/00
(52) U.S. Cl. ................. 428/142; 428/141; 428/142; 428/156; 428/432; 428/469
(58) Field of Search ................. 428/141, 142, 428/143, 156, 325, 447, 428, 432, 433, 469, 472

(56) References Cited

U.S. PATENT DOCUMENTS 3,354,022 A * 11/1967 Johnson, Jr. et al. ....... 428/167

(Continued)

FOREIGN PATENT DOCUMENTS

| DE | 19941753.9 | 9/1999 |
| DE | 19945513.9 | 9/1999 |

(Continued)

OTHER PUBLICATIONS

International Search Report for International Application No. PCT/EP01/02790 dated Jul. 18, 2001.

*Primary Examiner*—Deborah Jones
*Assistant Examiner*—G. Blackwell-Rudasill
(74) *Attorney, Agent, or Firm*—Rankin, Hill, Porter & Clark LLP

(57) ABSTRACT

The invention relates to glass, ceramic and metal substrates with at least one self-cleaning surface, comprising a layer with a micro-rough surface structure which is arranged on the substrate and made at least partly hydrophobic. The layer contains a glass flux and structure-forming particles with a mean particle diameter within the 0.1 to 50 μm range; the glass flux and structure-forming particles are present in a volume ratio within the 0.1 to 5 range, and the micro-rough surface structure has a ratio of mean profile height to mean distance between adjacent profile tips within the 0.3 to 10 range.

To produce the subject of the invention the substrate is coated with a composition containing a glass flux and structure-forming particles, and the layer is burnt in and made hydrophobic.

20 Claims, 1 Drawing Sheet

U.S. PATENT DOCUMENTS

| | | | |
|---|---|---|---|
| 3,931,428 A | 1/1976 | Reick | |
| 3,951,633 A | 4/1976 | Danihel | |
| 3,958,073 A | 5/1976 | Trevisan et al. | |
| 3,998,643 A | 12/1976 | Liddle | |
| 4,377,608 A | 3/1983 | Duadt et al. | |
| 4,387,195 A | 6/1983 | Tully et al. | |
| 4,410,563 A | 10/1983 | Richter et al. | |
| 4,482,656 A | 11/1984 | Nguyen et al. | |
| 4,687,707 A | 8/1987 | Matsuo et al. | |
| 5,240,774 A | 8/1993 | Ogawa et al. | |
| 5,324,566 A | 6/1994 | Ogawa et al. | |
| 5,424,130 A | 6/1995 | Nakanishi et al. | |
| 5,437,894 A | 8/1995 | Ogawa et al. | |
| 5,466,486 A | 11/1995 | Ogawa et al. | |
| 5,478,651 A | 12/1995 | Tannenbaum | |
| 5,599,489 A | 2/1997 | Saiki et al. | |
| 5,674,625 A | 10/1997 | Takahashi et al. | |
| 5,800,918 A | 9/1998 | Chartier et al. | |
| 5,808,125 A * | 9/1998 | Standke et al. | 556/424 |
| 6,048,910 A | 4/2000 | Furuya et al. | |
| 6,156,409 A | 12/2000 | Doushita et al. | |
| 6,235,383 B1 | 5/2001 | Hong et al. | |
| 6,403,213 B1 | 6/2002 | Huesmann | |
| 6,447,919 B1 | 9/2002 | Brown et al. | |
| 6,461,670 B2 | 10/2002 | Akamatsu et al. | |
| 6,471,761 B2 | 10/2002 | Fan et al. | |
| 6,485,838 B1 | 11/2002 | Shimada et al. | |
| 6,511,753 B1 | 1/2003 | Teranishi et al. | |
| 2002/0150725 A1 | 10/2002 | Nun et al. | |
| 2002/0164443 A1 | 11/2002 | Oles et al. | |

FOREIGN PATENT DOCUMENTS

| | | |
|---|---|---|
| DE | 19946280.1 | 9/1999 |
| DE | 10018223 A1 | 4/2001 |
| DE | 10059487 A1 | 6/2002 |
| EP | 0684075 A1 | 11/1995 |
| EP | 0748775 A2 | 12/1996 |
| EP | 0867490 A2 | 9/1998 |
| EP | 0887179 A1 | 12/1998 |
| EP | 0867490 A3 | 2/1999 |
| EP | 0909747 A1 | 4/1999 |
| EP | 1075867 A1 | 2/2001 |
| WO | WO-96/04123 A1 | 2/1996 |
| WO | WO-01-74739 A1 | 10/2001 |
| WO | WO-02/49980 A1 | 6/2002 |
| WO | WO-02/064266 A2 | 8/2002 |
| WO | WO-03/013827 A1 | 2/2003 |

* cited by examiner

GLASS CERAMIC AND METAL SUBSTRATES WITH A SELF-CLEANING SURFACE, METHOD FOR THE PRODUCTION AND USE THEREOF

BACKGROUND OF THE INVENTION

1. Field of the Invention

The invention relates to glass, ceramic and metal substrates with at least one structured hydrophobic surface which provides a good self-cleaning effect. Another subject of the invention is a method of making said substrates with a self-cleaning surface, the method comprising forming a structured surface then making it hydrophobic. A further subject is use of the glass, ceramic and metal substrates with a surface according to the invention having a self-cleaning effect.

It is known that in order to obtain a good self-cleaning effect a surface needs to have not only good hydrophobic properties but also a micro-rough surface structure. Both features are present in nature, for example in the lotus leaf; the surface, formed from a hydrophobic material, has pyramidal elevations a few micrometers away from each other. Drops of water substantially come into contact only with these tips, so the contact area is minute, resulting in very low adhesion. These relationships and the theoretical possibility of applying the "lotus effect" to industrial surfaces are taught by A A Abramzon, Khimia i Zhizn (1982), No. 11, 38–40.

2. Description of the Related Art

Without reference to the lotus effect, water-repellent surfaces are known from U.S. Pat. No. 3,354,022, where the surface has a micro-rough structure with elevations and depressions and is formed from a hydrophobic material in particular a fluorine-containing polymer. In one embodiment a surface with a self-cleaning effect may be applied to ceramic bricks or to glass by coating the substrate with a suspension containing glass spheres with a diameter within the 3–12 $\mu$m range and a glass sphere (diameter 3–12 $\mu$m) and a fluorocarbon wax based on a fluoroalkylethoxy methacrylate polymer. A disadvantage of such coatings with a self-cleaning effect is their poor resistance to abrasion. As established by the inventors involved in this patent application, glass spheres do indeed form a structure but their self-cleaning effect is only moderate.

EP 0 909 747 A1 teaches a method of producing self-cleaning properties in surfaces, particularly roof tiles. The surface has hydrophobic elevations 5 to 200 $\mu$m high. A surface of this type is formed by applying a dispersion of powder particles of an inert material in a siloxane solution then letting it harden. As in the previously assessed method the structure-forming particles are not fixed on the surface of the substrate in an abrasion-resistant manner.

EP 0 772 514 B1 and EP 0 933 388 A2 teach of self-cleaning surfaces on articles with an artificial surface structure comprising elevations and depressions, the distance between the elevations being within the 5 to 200 $\mu$m range (EP 0 772 514 B1) or the 50 nm to 10 $\mu$m range (EP 0 933 388 A2) and the height of the elevations being within the 5 to 100 $\mu$m range or the 50 nm to 10 $\mu$m range respectively and the structure being made of hydrophobic polymers or materials made durably hydrophobic. Methods suitable for forming the structures are etching and embossing processes, coating processes for sticking on a structure-forming powder and shaping processes using appropriately structured female moulds. If the material forming the structure is not itself hydrophobic the formation of the structure is followed by treatment to make it hydrophobic, particularly by silanising it. Although self-cleaning surfaces according to EP 0 772 514 B1 may also be applied to glazing or roofs the process is very expensive and the surface forming the structure, like that in the documents assessed above, has little resistance to abrasion, so the self-cleaning effect declines rapidly under quite strong mechanical stress.

BRIEF SUMMARY OF THE INVENTION

The object of the invention is to indicate substrates of glass, a ceramic material or metal with a structured and hydrophobic surface having a good self-cleaning effect. A further object is that the structured surface should have higher abrasion resistance than known surfaces in which structure-forming particles were fixed to the surface by means of an organic polymer. A further object of the invention is that substrates with the self-cleaning surface according to the invention should be obtainable by a simple method. It should be possible to carry out the structure-forming method using stages in the process and industrial apparatus normal for surface treatment, such as decoration, of said substrates.

BRIEF DESCRIPTION OF THE DRAWINGS

The FIGURE shows a scanning electron microscope photograph of a self-cleaning surface according to the invention.

DETAILED DESCRIPTION OF THE INVENTION

It has been found that the above objects and other objects revealed in the following description can be achieved, in that a substrate of glass, a ceramic material or metal is coated with a composition containing a material producing a glass flux such as a glass frit and structure-forming particles, and the coated substrate is fired at a temperature adapted to the substrate and the material forming the glass flux then made hydrophobic, the substrate being made hydrophobic preferably using a fluoroalkylsilane or fluoroalkylsiloxane.

The subject of the invention is accordingly a glass, ceramic or metal substrate with at least one self-cleaning surface comprising a layer with a micro-rough surface structure which is arranged on the substrate and made at least partly hydrophobic, characterised in that the layer contains a glass flux and structure-forming particles with a mean particle diameter within the 0.1 to 50 $\mu$m range, the glass flux and structure-forming particles are present in a volume ratio within the 0.1 to 5 range, and the micro-rough surface structure has a ratio of mean profile height to mean distance between adjacent profile tips within the 0.3 to 10 range. The sub-claims relate to some preferred embodiments.

The substrates in question are ones which are resistant to ceramic burning under temperature conditions adapted to the substrate. They are accordingly glass of any chemical composition including glass-ceramics, any ceramic materials such as bricks, clinker, architecturally applied ceramics, stoneware, vitrified clay, hard and soft porcelain, oxide and special ceramics and metals, in particular steels. The substrates may also be coated with coloured slip, glazed or enamelled before the self-cleaning surface is applied.

The term "self-cleaning surface" is used in the same sense as in prior art. The surface is virtually unwettable by water and preferably by other liquids, so rapid drop formation becomes possible and dirt particles deposited are washed away in a simple manner with the drops running down. Substrates with a self-cleaning surface produced according to the invention are substantially dry when water has run off the surface.

The self-cleaning surface has a micro-rough structure, i.e. a structure with elevations and depressions in a geometrical or random, preferably random arrangement. The elevations and depressions are distributed substantially over the whole self-cleaning surface. There may be a simple structure of elevations and depressions; alternatively the micro-roughness may comprise a coarse structure and a fine structure, with the elevations and depressions of the fine structure located on a coarse structure (=superstructure) having depressions and elevations. A surface with a coarse and a fine structure has been found to allow a particularly good self-cleaning effect.

The mean profile height of the surface roughness is normally within the 0.2 to 10 µm range although values outside those limits are not excluded. Roughness with a profile height within the range from approx. 1 µm to approx. 10 µm is preferred. If the surface has both a coarse and a fine structure the mean profile height of the fine structure is generally within the range from 0.2 to approx. 4 µm, particularly 0.5 to 3 µm and that of the coarse structure within the range from 1 to 10 µm but above the height of the fine structure.

A feature of the surface structure which is important for a good self-cleaning effect is the ratio of the mean profile height to the mean distance between adjacent profile tips. This aspect ratio is desirably within the 0.3 to 10 range, preferably within the 1 to 5 range and particularly preferably within the 1 to 2 range. Said aspect ratios apply to both the coarse and the fine structure.

The micro-rough surface structure is formed from particles anchored in a glass flux and/or particle aggregates bonded together by glass flux. The glass flux is thus the binder for the structure-forming particles and gives the surface structure considerably higher abrasion resistance than was possible using known resins. The layer forming a micro-rough surface structure substantially comprises a glass flux and the structure-forming particles. A fraction of the particles may be completely enveloped in glass flux but another fraction, namely the fraction forming the structure, projects out of the flux. In addition to the glass flux and structure-forming particles the micro-rough layer may contain other constituents, for example pigments to give the system a decorative appearance or metallic powders providing electrical conductivity. Said categories of material may themselves be a component of the structure-forming particles.

The layer with the micro-rough surface structure located on the substrate contains glass flux and structure-forming particles in a volume ratio desirably within the 0.1 to 5 range, preferably within the 0.2 to 2 range and particularly preferably within the 0.3 to 1 range. As the proportion of glass flux increases, given the same particle spectrum, the degree of roughness and thus the effectiveness is diminished. Conversely if the quantity of glass flux is too small, abrasion-proof fixing of the structure-forming particles on the substrate surface can no longer be guaranteed. The volume ratio of glass flux to structure-forming particles which is particularly suitable for the intended purpose also depends to a certain extent on the particle spectrum of the structure-forming particles. The optimum ratio can be determined by carrying out simple tests.

The mean particle diameter of the structure-forming particles may be within a range from 0.1 to 50 µm, although it is preferably within the range from 0.2 to 20 µm and particularly preferably within the range from 0.5 to 15 µm. As the mean particle diameter of the structure-forming particles and the thickness of the micro-rough layer increase the layer becomes more opaque. A layer with the above-mentioned preferred bimodal structure (fine structure on a superstructure) contains a spectrum of structure-forming particles with an adequate proportion of fine particles, preferably within the range from 0.2 to 3 µm, and an adequate proportion of coarse particles of a diameter within the range from 3 to 15 µm, particularly from 5 to 10 µm.

The particles used to form the micro-rough structure are those with a melting point above the firing temperature and thus above the deformation point of the glass flux. Particularly effective surface structures are found to be obtained when the structure-forming particles are idiomorphic, i.e. when they have pronounced edges and faces. Although particles with a rather spherical morphology or even glass spheres enable a micro-rough surface structure to be formed, its self-cleaning effect is only moderate or unsatisfactory.

Any products may be present as structure-forming particles; their melting point is above the firing temperature and the structure is preferably idiomorphic. Some examples of structure-forming particles are oxides and silicates such as zirconium silicates, zeolites, $SiO_2$, $TiO_2$, $ZrO_2$, $SnO_2$ and $Al_2O_3$.

The glass flux may be of very different compositions; numerous glass compositions are known to experts, covering the deformation range from approx. 500 to over 1000° C. Glass compositions of the flux for a micro-rough surface structure on glass understandably have a deformation temperature below that of the glass substrate. Micro-rough surface structures on for example ceramic substrates generally have a substantially higher deformation point.

The thickness of the micro-rough layer is variable, generally within the range from 5 to 100 µm, preferably from 10 to 20 µm. The given thickness covers the height of the layer including the mean profile height of the elevations.

The surface of the micro-rough layer is at least partly made hydrophobic, especially the tips of the elevations. However the whole surface is preferably made hydrophobic. This is done substantially by a very thin coating, for example 1 to 10 nm thick, which adheres firmly to the surface below it. The adhesion results from the coating material forming a film after application. Preferred agents for making the surface hydrophobic are chemically bonded to the substrate for example by a Si—O—Si bridge. Such bridges result from the reaction of a silanol group of a silicate substrate with an alkoxysilane or alkoxysiloxane. Preferred substrates according to the invention with a self-cleaning surface have a coating, often only very few atomic layers thick, based on an alkyltrialkoxysilane and preferably a longer-chain fluoroalkyl trialkoxysilane or oligomers of those silanes.

The FIGURE shows a scanning electron microscope photograph of a self-cleaning surface according to the invention, where the substrate is glass and the structure-forming particles are a zeolite of the Pentasil type (ZSM 5) bonded to the substrate by a glass flux. The volume ratio of zeolite to glass flux is 1 to 1; a printing paste containing zeolite and glass frit in said volume ratio has been applied to the substrate by screen printing and burnt in at 650° C. The surface thus produced had an extremely good self-cleaning effect and high abrasion resistance.

Substrates according to the invention with a self-cleaning surface can be produced by a method comprising applying a hydrophobic, micro-rough layer to the substrate and characterised by the steps of coating the substrate with a composition containing a glass frit which forms a glass flux and structure-forming particles with a mean particle diameter within the 0.1 to 50 µm range, the composition containing glass frit and structure-forming particles in a volume ratio within the 0.1 to 5 range, burning in the layer at a temperature above the deformation temperature of the glass frit, and making the burnt-in layer at least partly hydrophobic by applying an agent to make it hydrophobic.

The choice of material, the structure and the spectrum of structure-forming particles used in the composition forming the layer can be found in the above description. The same applies to the volume ratio of glass frit forming glass flux to structure-forming particles to be used; glass flux and glass frit have the same volume, so the said ratio is also the same. The glass frit forming the glass flux may be one frit or a mixture of different glass frits. In addition to the one or more glass frits and the structure-forming particles the composition may also contain one or more inorganic pigments and/or metallic powders such as silver for conductivity purposes and/or processing aids to improve the preparation of the composition and/or its application to the substrate to be coated.

To produce a metallic substrate with a self-cleaning surface it is desirable to select the usual glass frits for making enamels on metallic substrates. It may be desirable, in order to improve adhesion, first to provide the metallic substrate with a base enamel and only then to apply the composition for forming a layer with a micro-rough surface structure to the enamel.

The composition to be used for forming the micro-rough layer may be applied in a known manner to at least one surface of the substrate to be coated. Suitable methods of doing so are direct and indirect printing processes including screen printing and pad transfer printing processes, also dipping and spraying methods and electrostatic coating processes.

To enable the layer-forming composition to be applied in a normal printing process the composition contains, in addition to the above-mentioned inorganic constituents, a liquid printing medium in which the inorganic constituents are made into a paste. Aqueous and/or organic or organic-aqueous media may be used, containing one or more organic binders and possibly normal processing aids such as viscosity regulators in addition to one or more solvents. Appropriate media are those known in the art for producing printing pastes for making ceramic decorations which are burnt-in in a decorative baking process.

In an alternative embodiment the layer-forming composition is applied to the substrate to be coated by a known electrostatic coating process. For this purpose the composition should desirably also contain a few percent of a thermoplastic material, in particular 1 to 8% by weight of a polyethylene wax, and the substrate should be heated to a temperature above the deformation point of the thermoplastic material before or immediately after the electrostatic coating. Details of electrostatic coating of glass and ceramic materials can be found in WO 94/26679 and WO 98/58889.

Application of the layer-forming composition to the substrate is followed by normal baking. At a temperature above the deformation point of at least one glass frit, the frit fuses together into a glass flux. The structure-forming particles near the surface surprisingly form the required micro-rough surface structure with the aspect ratio claimed. The particles located at the surface are securely anchored in the glass flux.

In a further embodiment the micro-rough layer is printed by means of a printing paste containing a glass frit which forms a glass flux, and the structure-forming particles are applied to the still moist printing surface for example by powdering or dripping on, possibly followed by partial pressing of the particles into the printed surface. The substrate thus treated is then burnt and made hydrophobic in a known manner.

After the baking at least part of the micro-rough surface, particularly the tips of the elevations, preferably the whole surface is made hydrophobic. The agents for making the surface hydrophobic are products normally used in the art. They are either polymers with that action or preferably monomeric or oligomeric compounds containing a fairly long-chain alkyl or preferably fluoroalkyl radical with that action and also a functional group whereby the compounds with a hydrophobising action can be cross-linked and thus form a film and/or whereby a reaction with functional groups at the surface of the micro-rough layer is enabled.

The micro-rough surface may be made hydrophobic by applying a lacquer or by polymerising monomers on the surface. Some suitable polymeric lacquers are solutions or dispersions for example of polyvinylidene fluoride.

As an alternative to the use of fluorine-containing silanes and siloxanes, the surface may be made hydrophobic by plasma polymerisation of fully or partly fluorinated vinyl compounds.

It is particularly desirable for the surface to be made hydrophobic using reactive alkyl or preferably fluoroalkyl silanes and oligomeric alkyl or fluoroalkyl siloxanes. The silanes or siloxanes preferably contain one or more alkoxy groups such as ethoxy groups as the reactive group. The agent for making the surface hydrophobic may be cross-linked and also chemically bound to a silicate surface containing silanol groups by these alkoxy groups. Particularly preferred silanising agents are tridecafluorooctyltri-ethoxy silane and oligomers thereof (Dynasilanes® produced by Sivento Chemie Rheinfelden GmbH). Products of this type may be applied to the surface to be made hydrophobic in the form of dilute organic, in particular alcoholic, aqueous-organic and aqueous solutions for example by dipping, spraying or painting.

When a solution containing a fluorine-containing silane or siloxane has been applied to it, the substrate is dried and hardened preferably at a temperature up to 500° C., for example for 10–15 minutes at 250 to 300° C. or 1 minute at about 500° C. or 30–60 minutes at about 150° C. The optimum thermal post-treatment for maximum abrasion resistance is at a temperature in the range from 200 to 300° C.

By using dilute solutions of said silanes or siloxanes chemically and mechanically very resistant layers only a few nm thick are obtained, which are 2- and 3-dimensional siloxane networks.

Hydrophobic layers which can be obtained by using reactive fluoroalkyl silanes or siloxanes are characterised by equally good hydrophobic and oleophobic properties, so even substrates according to the invention which are soiled with hydrophobic dirt particles can easily be cleaned with water.

Substrates with a self-cleaning surface according to the invention may be used wherever the surface (a) is exposed to a constant danger of soiling and (b) must be cleanable in an extremely simple manner with water. Glass substrates with a self-cleaning surface according to the invention can appropriately be used for glazing vehicles and trains and for glass bricks. Ceramic substrates with a self-cleaning surface according to the invention are suitable for use as a building material such as roof tiles, clinker and floor tiles.

The advantages of the invention are that self-cleaning surfaces of glass, ceramic and metal substrates are easily accessible and have a good self-cleaning effect. The structure-forming layer has high abrasion resistance. Preferred surfaces have "super-hydrophobic properties", causing water drops to run down them almost without friction. In addition to surfaces where a self-cleaning effect is important, substrates with a structured surface made hydrophobic according to the invention are also suitable for chemical engineering apparatus such as coated pipes and heat exchanger plates.

The invention will be further explained with reference to the following examples.

EXAMPLES

General information on the production of substrates with a self-cleaning surface follows. Details such as the products used, relative quantities and baking conditions to obtain the structured surface and conditions to make it hydrophobic can be found in the Tables.

Direct printing: Glass frit and structure-forming particles were made into a paste in a known manner with a printing medium which can be diluted with water (No. 80858 from dmc$^2$ AG) or a purely organic one (No. 80820 from dmc$^2$ AG), and the printing paste was applied to the substrate by screen printing.

Indirect printing: Glass frit and structure-forming particles were made into a paste with a screen printing oil (No. 80820 from dmc$^2$ AG). The printing method was screen printing on transfer paper; after drying a covering film was formed. The printed image was applied in known manner to the substrate to be decorated.

Electrostatic application: Glass frit and structure-forming particles mixed with Siloxane H68 (Weinstock & Siebert) were treated (first mixed then tempered) to raise the specific resistance of the powder to >$10^{14}$ $\Omega$m. The powder mixture of the glass frit thus siliconised and structure-forming particles was applied using an electrostatic gun at 90 kV.

The coatings applied to the substrate by direct or indirect printing or electrostatically were burnt-in in a known manner; heating-up time 200 K/h, $T_{max}$ and holding time are given in the Table.

The substrate was 4 mm float glass in all the examples.

The glass frits were a low melting point glass frit with a high Pb content, a $d_{50}$ value of 3.3 $\mu$m and a $d_{90}$ value of 10 $\mu$m (No. 10022 from dmc$^2$ AG), another glass frit (No. 10157 from dmc$^2$ AG) and a glass frit for electrostatic glazing (VNR 9316 F) with a $d_{50}$ value of 3.7 $\mu$m and a $d_{90}$ value of 6.8 $\mu$m.

The structure-forming particles used were zirconium dye pigments, namely zirconium iron rose (FK 27357 from dmc$^2$ AG), and a hydrophobic zeolite of the Pentasil type (Wessalith® DAZ).

The structured burnt-in surface was made hydrophobic using a fluoroalkyl silane formulation, namely Dynasilan® F8262 (Degussa-Hüls AG) (a solution of tridecafluorooctyl-triethoxy silane in ethanol). The solution was poured over the surface then hardened at an elevated temperature.

The self-cleaning effect was evaluated by a test with drops of water running down a slightly inclined surface:

+++ very good, ++ good, + moderate, o poor.

Tables 1a and 1b below give the detailed conditions and results.

TABLE 1a

|  | 1 | 2 | 3 | 4 | 5 | 6 |
| --- | --- | --- | --- | --- | --- | --- |
| Glass frit* | 10022 | 10022 | 10022 | 10022 | 10022 | 10022 |
| Structure-forming particles* | FK 22389 | FK 22389 | FK 22389 | FK 27357 | FK 27357 | FK 27357 |
| Glass frit/particles (volume ratio) | 50:50 | 80:20 | 50:50 | 50:50 | 50:50 | 50:50 |
| Printing medium* | 80858 | 80858 | 80820 | 80858 | 80820 | 80820 |
| (ratio of frit + particles: medium) | 10:3 | 10:3 | 10:10 | 10:6 | 10:10 | 10:10 |
| Application method | direct | direct | indirect | direct | direct | direct |
| Screen fabric | 100 | 180 | 100 | 100 | 180 | 100 |
| Baking condition: ° C./min | 560/4 | 560/4 | 560/4 | 560/4 | 560/4 | 660/4 |
| Making hydrophobic: Hardening conditions | 150° C./ 60 min | 150° C./ 60 min | 150° C./ 60 min | 300° C./ 60 min | 300° C./ 60 min | 300° C./ 60 min |
| Drop of water running down effect | +++ | + | +++ | +++ | ++ | ++ |

*Numbers given are product numbers of commercially available products of dmc$^2$ AG TABLE 1b

|  | 7 | 8 | 9 | 10 | 11 |
| --- | --- | --- | --- | --- | --- |
| Glass frit* | 10157 | 10022 | 10022 | 10022 | VNR 9316F |
| Structure-forming particles* | FK 22389 | DAZ | DAZ | DAZ | ** |
| Glass frit/particles (volume ratio) | 50:50 | 50:50 | 50:50 | 50:50 |  |
| Printing medium* | 80858 | 80858 | 80858 |  | 80858 |
| (ratio of frit + particles: medium) | 10:6 | 10:7 | 10:7 |  | 10:8 |
| Application method | direct | direct | direct | electro-static | direct |
| Screen fabric | 100 | 100 | 180 |  | 100 |

TABLE 1b-continued

|  | 7 | 8 | 9 | 10 | 11 |
|---|---|---|---|---|---|
| Baking condition: °C./min | 560/4 | 560/4 | 560/4 | 650/4 | 630/4 |
| Making hydrophobic: hardening conditions | 150° C./ 60 min | 150° C./ 60 min | 150° C./ 60 min | 150° C./ 60 min | 150° C./ 60 min |
| Drop of water running down effect | ++ | ++ | ++ | ++ | O |

*Numbers given are product numbers of commercially available products of dmc$^2$ AG
**The glass frit fuses incompletely and is thus structure-forming; surface like matt glass; micro-structure differs from that in Examples 1–10, in that the elevations are rounded

What is claimed is:

1. A glass, ceramic or metal substrate with at least one self-cleaning surface comprising a layer with a micro-rough surface structure which is arranged on the substrate and made at least partly hydrophobic, characterised in that the layer contains a glass flux and structure-forming particles with a mean particle diameter within the 0.1 to 50 μm range, the glass flux and structure-forming particles are present in a volume ratio within the 0.1 to 5 range, and the micro-rough surface structure has a ratio of mean profile height to mean distance between adjacent profile tips within the 0.3 to 10 range.

2. A substrate with a self-cleaning surface according to claim 1, wherein the substrate is selected from the group consisting of glass, porcelain, vitrified clay, stoneware, clinker and brick substrates.

3. A substrate with a self-cleaning surface according to claim 1, wherein the volume ratio of glass flux to structure-forming particles is within the range of from 0.2 to 2.

4. A substrate with a self-cleaning surface according to claim 1, wherein the micro-rough surface structure has an aspect ratio within the range of from 1 to 5.

5. A substrate with a self-cleaning surface according to claim 1, wherein the structure-forming particles have a mean diameter within the range of from 0.5 to 15 μm.

6. A substrate with a self-cleaning surface according to claim 1, wherein the structure-forming particles are idiomorphic.

7. A substrate with a self-cleaning surface according to claim 1, wherein the layer which makes the surface hydrophobic is based on a fluoroalkyl alkoxysilane or a fluoroalkyl alkoxysiloxane.

8. A substrate with a self-cleaning surface according to claim 1 for use in a construction and/or decorative application, self-cleaning elements in the building industry, or plant construction.

9. A glass, ceramic or metal substrate with at least one self-cleaning surface comprising a layer with a micro-rough surface structure which is arranged on the substrate and made at least partly hydrophobic, wherein the layer contains a glass flux and structure-forming particles having a bimodal size distribution, wherein a first portion of structure-forming particles has a mean diameter from 0.2 to 3 μm and a second portion of structure-forming particles has a mean diameter from 3 to 15 μm, the glass flux and structure-forming particles are present in a volume ratio within the 0.1 to 5 range, and the micro-rough surface structure has a ratio of mean profile height to mean distance between adjacent profile tips within the 0.3 to 10 range.

10. A substrate with a self-cleaning surface according to claim 9, wherein the second portion of structure forming particles has a mean diameter of 5 to 10 μm.

11. A substrate with a self-cleaning surface according to claim 9, wherein the glass flux and structure-forming particles are present in a volume ratio within the 0.2 to 2 range, and the micro-rough surface structure has a ratio of mean profile height to mean distance between adjacent profile tips within the 0.3 to 10 range.

12. A substrate with a self-cleaning surface according to claim 9, wherein the micro-rough surface structure has a ratio of mean profile height to mean distance between adjacent profile tips within the 1 to 5 range.

13. A substrate with a self-cleaning surface according to claim 9, wherein the layer is made partly hydrophobic by application of a substance selected from the group consisting of fluoroalkyl alkoxysilane, fluoroalkyl alkoxysiloxane, and partly fluorinated vinyl polymer.

14. A substrate with a self-cleaning surface according to claim 9, wherein the substrate is selected from the group consisting of glass, porcelain, vitrified clay, stoneware, clinker and brick substrates.

15. A substrate with a self-cleaning surface according to claim 9, wherein the volume ratio of glass flux to structure-forming particles is within the range of from 0.3 to 1.

16. A substrate with a self-cleaning surface according to claim 9, wherein the micro-rough surface structure has an aspect ratio within the range of from 1 to 2.

17. A substrate with a self-cleaning surface according to claim 15, wherein the structure-forming particles have a mean diameter within the range of from 1 to 2 μm.

18. A substrate with a self-cleaning surface according to claim 9, wherein the structure-forming particles are idiomorphic.

19. A glass, ceramic or metal substrate with at least one self-cleaning surface comprising a layer with a micro-rough surface structure which is arranged on the substrate and made at least partly hydrophobic, wherein the layer contains a glass flux and structure-forming particles having a bimodal size distribution, wherein a first portion of structure-forming particles have a mean diameter from 0.2 to 3 μm and a second portion of structure-forming particles have a mean diameter from 5 to 10 μm, the glass flux and structure-forming particles are present in a volume ratio within the 0.2 to 2 range, and the micro-rough surface structure has a ratio of mean profile height to mean distance between adjacent profile tips within the 0.3 to 10 range.

20. The substrate of claim 19, wherein the structure forming particles are selected from the group consisting of $SiO_2$, $TiO_2$, $ZrO_2$, $SnO_2$, $Al_2O_3$, zirconium silicates, and zeolites.

* * * * *